(12) United States Patent
Gosch et al.

(10) Patent No.: US 12,352,975 B1
(45) Date of Patent: Jul. 8, 2025

(54) ELECTRONIC DEVICE WITH ADJUSTABLE COMPENSATION FREQUENCY

(71) Applicant: Apple Inc., Cupertino, CA (US)

(72) Inventors: Christian W Gosch, Campbell, CA (US); Sheila M Santos, San Francisco, CA (US); Sabine Webel, San Francisco, CA (US); Ritesh Gangadhar Sholapur, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/360,472

(22) Filed: Jul. 27, 2023

Related U.S. Application Data

(60) Provisional application No. 63/403,441, filed on Sep. 2, 2022.

(51) Int. Cl.
 *G02B 27/01* (2006.01)
 *G02B 27/00* (2006.01)

(52) U.S. Cl.
 CPC ..... *G02B 27/0172* (2013.01); *G02B 27/0031* (2013.01); *G02B 27/0093* (2013.01); *G02B 2027/0178* (2013.01)

(58) Field of Classification Search
 CPC . G06F 3/011; G02B 27/0172; G02B 27/0031; G02B 27/0093; G02B 2027/0178
 See application file for complete search history.

(56) References Cited

U.S. PATENT DOCUMENTS

| | | |
|---|---|---|
| 9,370,302 B2 | 6/2016 | Krueger |
| 10,133,090 B2 | 11/2018 | Jiang |
| 10,416,763 B2 | 9/2019 | He et al. |
| 10,775,886 B2 | 9/2020 | Young et al. |
| 11,314,325 B2 | 4/2022 | Young et al. |
| 2004/0207635 A1* | 10/2004 | Miller ............ H04N 1/00 345/617 |
| 2017/0075421 A1 | 3/2017 | Na et al. |
| 2017/0124928 A1* | 5/2017 | Edwin ............ G09G 5/02 |
| 2017/0285343 A1 | 10/2017 | Belenkii et al. |
| 2019/0138088 A1* | 5/2019 | Evans ............ H04N 13/344 |

(Continued)

FOREIGN PATENT DOCUMENTS

WO  WO-2019217261 A1 * 11/2019 ........... G06T 15/205

*Primary Examiner* — Rodney Amadiz
(74) *Attorney, Agent, or Firm* — Treyz Law Group, P.C.; David K. Cole

(57) ABSTRACT

A head-mounted device includes one or more displays configured to present a media content to one or more eye boxes. The media content may be presented in a user interface window. The head-mounted device may include an eye tracker that tracks the position of a user's pupils and/or the user's point of gaze. Processors within the head-mounted device may calculate compensation functions based on the user's pupil position to compensate for geometric distortion, color aberration, optical cross-talk, and vignetting, and may calculate foveation based on the user's gaze. A gaze and pupil manager may determine changes in the user's pupil position and/or point of gaze. If the changes meet a threshold, the compensation function and foveation may be updated. If the changes fail to meet the threshold, recalculation of the compensation function and foveation may be paused to save power.

18 Claims, 9 Drawing Sheets

(56) References Cited

U.S. PATENT DOCUMENTS

| | | |
|---|---|---|
| 2020/0020308 A1 | 1/2020 | Deering et al. |
| 2020/0380728 A1* | 12/2020 | Alonso ..................... G06T 7/80 |
| 2021/0248714 A1* | 8/2021 | Isikdogan ............ G06V 40/193 |
| 2022/0005155 A1* | 1/2022 | Murdison ............. G06T 3/4007 |

* cited by examiner

ELECTRONIC DEVICE WITH ADJUSTABLE COMPENSATION FREQUENCY

This application claims the benefit of U.S. provisional patent application No. 63/403,441, filed Sep. 2, 2022, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays may display the images based on a user's eye position. However, it may be challenging to adjust the displayed images.

SUMMARY

An electronic device, such as a head-mounted device, may include one or more displays configured to present content to a user. To provide the content to the user without distortion, aberration, and other optical issues, the electronic device may track a user's pupil position and gaze and adjust the displayed content based on the pupil position and gaze. For example, a compensation function (i.e., a display mesh) may be calculated based on the user's pupil position to compensate for geometric distortion, color aberration, optical cross-talk, and vignetting that would otherwise be present in the displayed content. Similarly, foveation parameters may be calculated to provide higher resolution content at the user's gaze direction and lower resolution content at the periphery of the user's vision. Image frames may then be displayed based on the calculated compensation function and foveation.

The compensation function and foveation may be updated when the user's pupil position and/or gaze changes. To save power in calculating the compensation function and foveation, processors within the electronic device may determine whether the user's pupil position and/or point of gaze has changed more than a threshold amount. If so, the compensation function and/or foveation may be recalculated. If not, the next image frame may be displayed based on the previously-calculated compensation function or foveation. In particular, because the user's pupil position or point of gaze has not changed by the threshold amount, the previous compensation may be sufficient to provide the displayed content to the user without distortion.

In addition to, or as an alternative to, pausing the recalculation of the compensation function based on the user's pupil position, the device may determine if the eye tracking capability is reduced, or if the user is blinking. If the eye tracking capability is reduced and/or the user is blinking, recalculation of the compensation function (or foveation) may be paused until the eye tracking is regained and the user is done blinking.

DETAILED DESCRIPTION

An electronic device such as a head-mounted device may have a front face that faces away from a user's head and may have an opposing rear face that faces the user's head. One or more displays may be used to provide images to a user's eyes. The display may provide the images with compensation functions (i.e., display meshes) and/or foveated rendering. For example, image frames may be displayed with compensation for geometric distortion, color aberration, optical cross-talk, and/or vignetting. In particular, the compensation functions may be at least partially based on the position of a user's pupils when a given image frame is displayed. Alternatively or additionally, image frames may be rendered with different quality based on where the user is looking (e.g., the image frames may have higher quality where the user is looking and lower quality at the user's peripheral vision).

Displaying each image frame with a different compensation function and/or foveation may be computationally prohibitive, expensive, or require excessive power. Therefore, electronic devices may pause the computation of compensation functions and/or foveated rendering in various circumstances. For example, electronic devices may track the user's pupil location, and pause the computation of compensation functions when the pupil location has not changed by more than a threshold amount as compared with the last image frame. Image frames may be displayed with the previously-calculated compensation function until the user's pupil location changes by more than the threshold amount. Additionally or alternatively, the electronic devices may track a user's gaze, pausing the computation of foveated rendering until the user's gaze changes by a threshold amount. As another example, the electronic devices may pause compensation function or foveation computation in response to losing eye-tracking capabilities or in response to a user's blink. Regardless of the computation scheme used, an illustrative electronic device that may employ these techniques is shown in FIG. 1.

Figure 1:
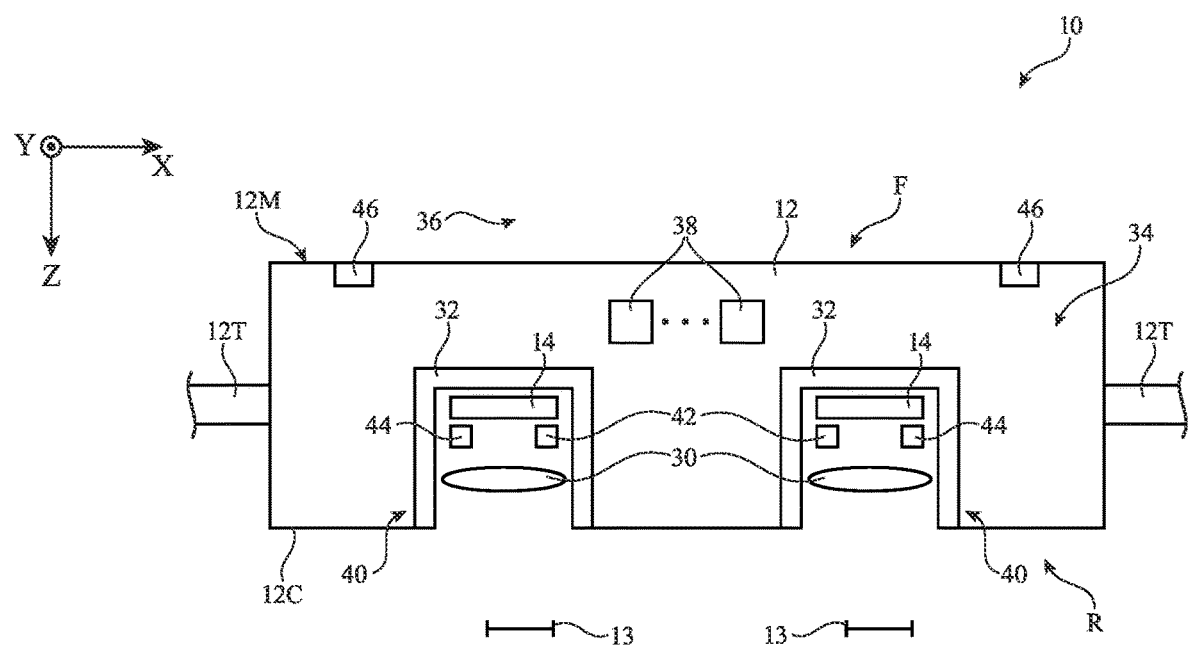
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have at least one, at least two, at least four, at least six, at least eight, at least ten, at least 12, less than 20, less than 14, less than 12, less than 10, 4-10, or other desired number of cameras 46. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's pupils, irises, or other portions of the user's eyes for user authentication. It may also be desirable to monitor the direction of the user's gaze. Gaze tracking information may be used as a form of user input and/or may be used to determine where, within an image, image content resolution should be locally enhanced in a foveated imaging system. Information regarding the location of a user's pupil(s) may be used in computing compensation functions for image frames displayed by displays 14. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Although FIG. 1 has shown device 10 as including two displays 14, this is merely illustrative. In general, device 10 may include any desired number of displays, such as one display that is viewed by both eyes. Additionally, although FIG. 1 depicts device 10 as a head-mounted device, device 10 may generally be any desired device, such as a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, a head-mounted device, an embedded system such as a system in which electronic equipment with a display is mounted in a kiosk or automobile, or other electronic equipment. Regardless of the type of electronic device, a schematic diagram of an illustrative electronic device is shown in FIG. 2.

Figure 2:
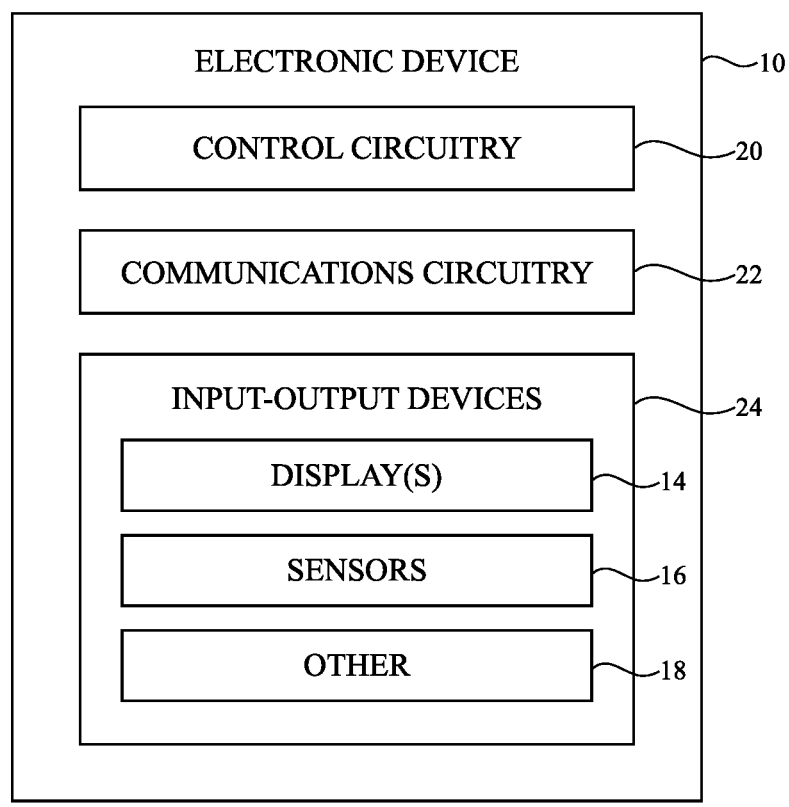
FIG. 2 is a schematic diagram of an illustrative head-mounted device in accordance with some embodiments.

As shown in FIG. 2, device 10 may be operated as a stand-alone device and/or the resources of device 10 may be used to communicate with external electronic equipment. As an example, communications circuitry, such as communications circuitry 22, in device 10 may be used to transmit user input information, sensor information, and/or other information to external electronic devices (e.g., wirelessly or via wired connections). Each of these external devices may include some or all of the components of the type shown by device 10 of FIG. 2 and/or other desired components.

As shown in FIG. 2, device 10, such as a head-mounted device, may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Communications circuitry 22 may include antennas, radio-frequency transceiver circuitry, and other wireless communications circuitry and/or wired communications circuitry. Communications circuitry 22 may be included in, and form a part of, control circuitry 20, or may be separate communications circuitry. Communications circuitry 22 may support bidirectional wireless communications between device 10 and external equipment (e.g., a companion device such as a computer, cellular telephone, another head-mounted device, or other electronic device, an accessory such as a point device or a controller, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, in gathering health or other biometric information from the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 (see, e.g., FIG. 1) may be used to present a fused stereoscopic image to the user's eyes when viewing from within eye boxes 13 and may sometimes be referred to collectively as a display 14. In one scenario, the user might be reading static content in a web browser on display 14. In another scenario, the user might be viewing dynamic content such as movie content in a web browser or a media player on display 14. In another scenario, the user might be viewing video game (gaming) content on display 14. In another scenario, the user might be viewing a live feed of the environment surrounding device 10 that is captured using the one or more front-facing camera(s) 46. If desired, computer-generated (virtual) content can be overlaid on top of one or more portions of the live feed presented on display 14. In another scenario, the user might be viewing a live event recorded elsewhere (e.g., at a location different than the location of the user) on display 14. In another scenario, the user might be conducting a video conference (a live meeting) using device 10 while viewing participants and/or any shared meeting content on display 14. These examples are merely illustrative. In general, display 14 can be used to output any type of image or video content.

Regardless of the image or video content provided by display 14, display 14 may provide image frames (i.e., frames of videos or individual images) based on compensation functions and/or foveated rendering. In particular, electronic device 10 may compute compensation functions (i.e., meshes) or foveation based on the position of a user's eyes (i.e., the user's pupils) or gaze. An example of an illustrative electronic device having an eye tracker and computation function and foveation processor is shown in FIG. 3.

Figure 3:
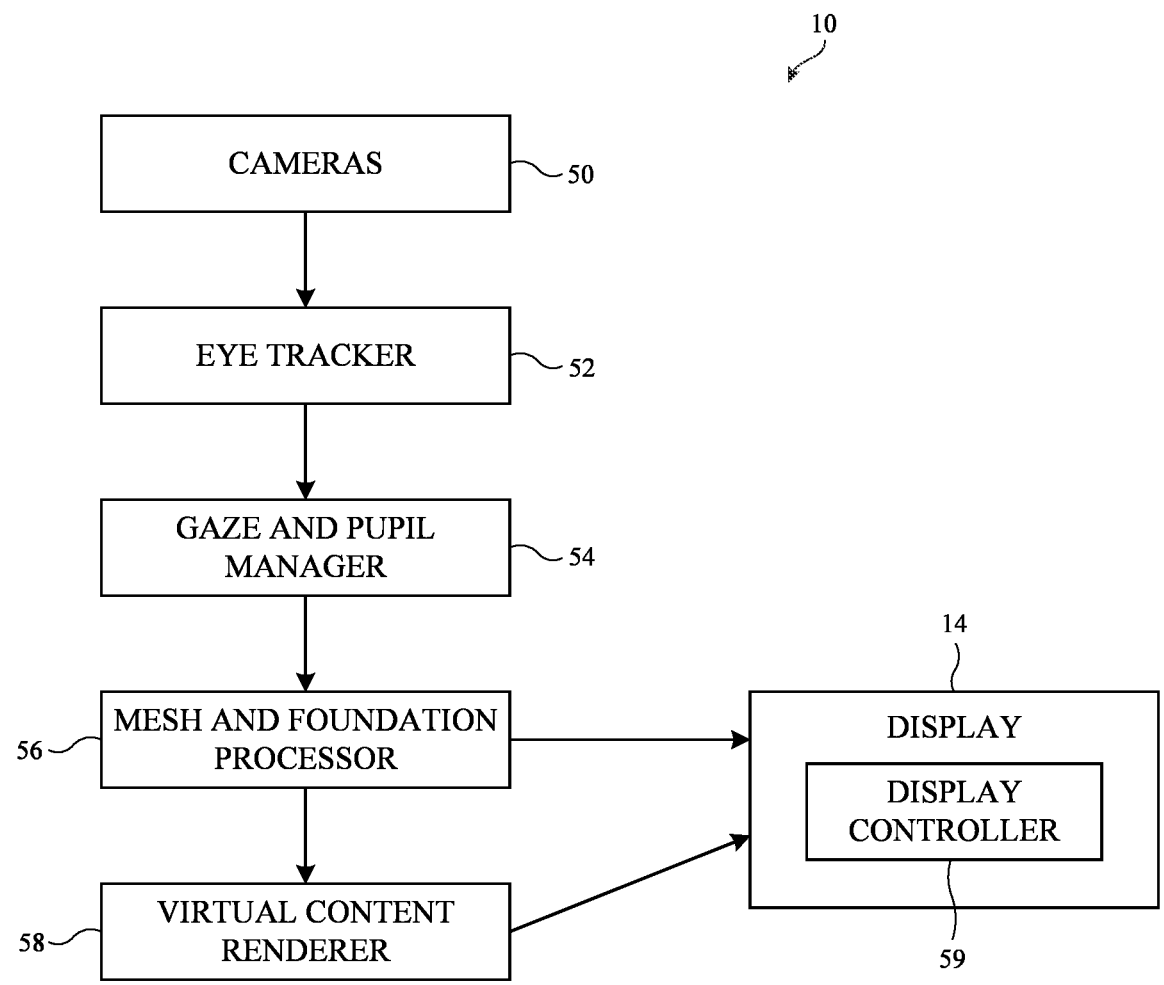
FIG. 3 is a schematic diagram of an illustrative compensation circuitry in accordance with some embodiments.

As shown in FIG. 3, device 10 may include cameras 50 that provide images or image data to eye tracker 52. For example, cameras 50 may be inwardly-facing cameras (i.e., face toward the eyes of the user) and may take images of the user's eyes. In some embodiments, cameras 50 may take images of the user's eyes directly. Alternatively or additionally, cameras 50 may be paired with illumination devices, such as light emitting diodes (LEDs), that illuminate the user's eyes with a given wavelength of light, and cameras 50 may detect light of the given wavelength that is reflected from the user's eyes.

After cameras 50 have taken an image of the user's eyes or light that has reflected from the user's eyes, eye tracker 52 may receive the images. Eye tracker 52 may process the images to determine the position of the user's eyes (e.g., the position of the user's pupils), the direction of the user's gaze (e.g., where the user is looking at the image frame displayed on display 14), and/or whether the user is blinking or has otherwise closed their eyes. Cameras 50 may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's eye position or gaze.

After eye tracker 52 has determined the user's eye position, gaze direction, and/or whether the user has blinking, gaze and pupil manager 54 may receive this information. Gaze and pupil manager 54 may compare the determined eye position, gaze direction, and/or blink status to previous positions/directions/statuses. For example, gaze and pupil manager 54 may determine how much a user's pupil has moved as compared to the last measurement of the user's pupil location. An illustrative example is shown in FIG. 4.

Figure 4:
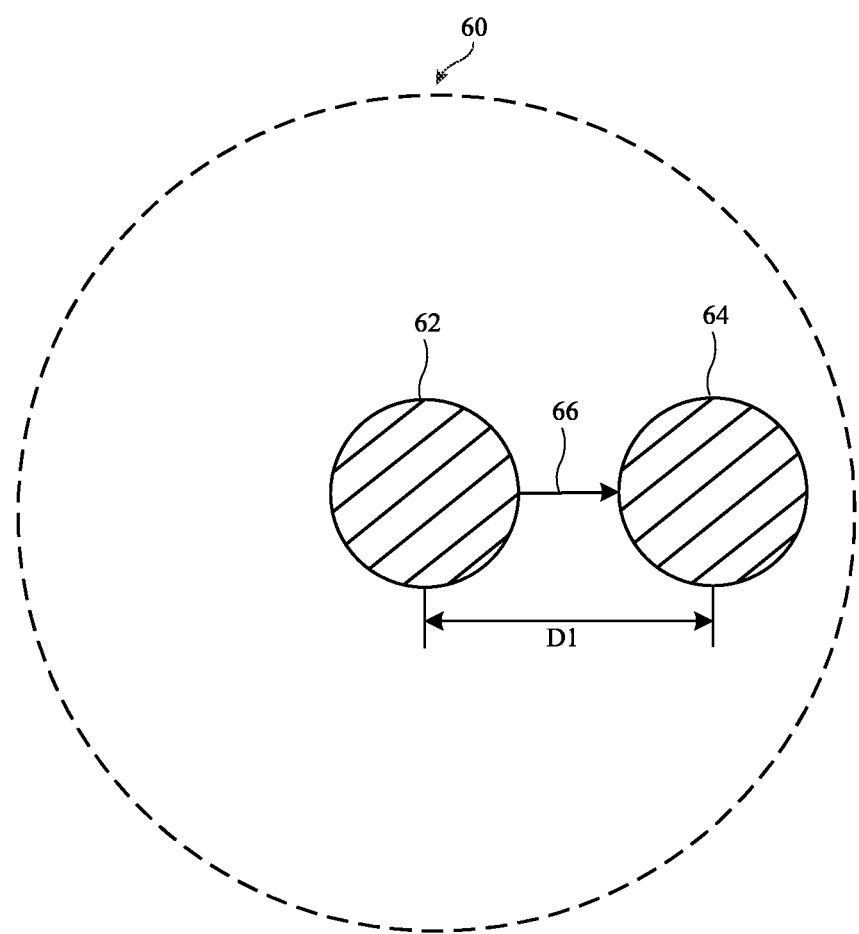
FIG. 4 is a view of a user's pupil at different locations in accordance with some embodiments.

As shown in FIG. 4, a user's eye 60 may initially have its pupil at position 62 (e.g., when a first image frame is displayed). While the user is using device 10, however, the pupil may move in direction 66 to position 64 (e.g., when a second image frame or other subsequent image frame is displayed). Gaze and pupil manager 54 (FIG. 3) may compare position 64 to position 62. In particular, gaze and pupil manager 54 may calculate a difference between position 64 and position 62, which may be given as distance D1. In some embodiments, gaze and pupil manager 54 may calculate a variance between position 64 and position 62 to determine whether the difference between position 64 and 62 is greater than a threshold value (e.g., so device 10 can determine whether to update the display frames). Gaze and pupil manager 54 may evaluate the variance against a threshold according to Equation 1, $$E[(p-E[p])^2] > \tau \qquad (1)$$

where p is the location of the pupil and τ is a threshold value (also referred to as a threshold condition herein) that is greater than or equal to zero.

As an alternative to, or in addition to, calculating the variance between pupil positions, gaze and pupil manager 54 may determine the difference between a user's gaze directions at different times. An illustrative example is shown in FIG. 5.

Figure 5:
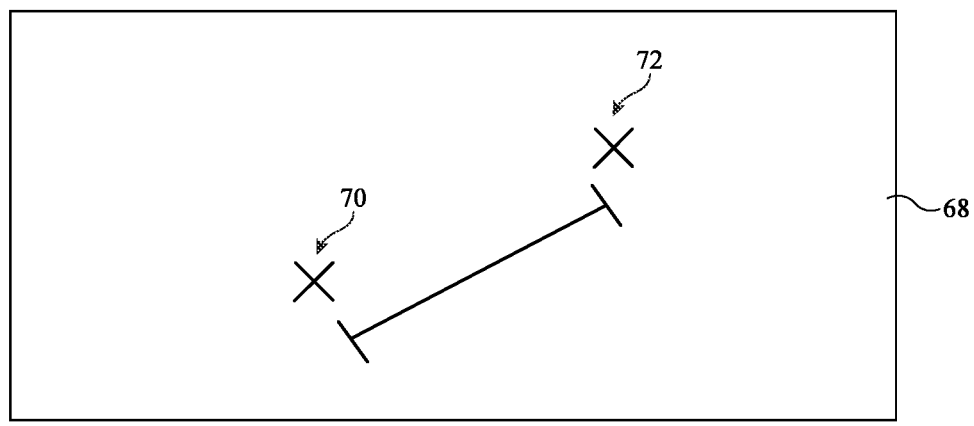
FIG. 5 is a view of a display and a user's point of gaze at various locations in the display area in accordance with some embodiments.

As shown in FIG. 5, a user's gaze may shift within display area 68 (i.e., an area in which display 14 displays images). For example, the user's point of gaze may move from a first point of gaze 70 to a second point of gaze 72 within display area 68. Gaze and pupil manager 54 (FIG. 3) may determine a difference/variance between first point of gaze 70 and second point of gaze 72, shown illustratively as D2. Equation 1 may be used to determine the variance between the two points of gaze and whether that variance exceeds a threshold, if desired.

Returning to FIG. 3, after gaze and pupil manager 54 has determined a difference or variance between user pupil positions and/or gaze direction, and/or has determined whether a user is blinking, mesh and foveation processor 56 may receive the information from gaze and pupil manager 54. Mesh and foveation processor 56 may calculate compensation functions and/or foveated rendering for image frames displayed by display 14. In particular, to compensate for visual artifacts in displayed images, mesh and foveation processor 56 may use the user's eye location (i.e., pupil location) and compensation functions to calculate a mesh for a given image frame. The mesh may include locations of each pixel in display 14 that will display respective pixels of the image frame. In this way, mesh and foveation processor 56 may compute a compensation function for each image frame, determine a mesh based on that compensation function, and send the mesh to display 14 (i.e., display controller 59) to display that image frame with the respective mesh.

In addition to, or as an alternative, compensating for such artifacts, mesh and foveation processor 56 may compute a foveation for each image frame. In particular, processor 56 may determine a foveation based on a user's point of gaze. For example, processor 56 may produce a foveation that has higher quality at the user's point of gaze and lower quality at the periphery of the user's gaze. Display 14 (i.e., display controller 59) may then apply this foveation to image frames displayed on display 14 to provide foveated rendering for the image frames.

The compensation functions (i.e., meshes) and/or foveation may be provided directly to display controller 59 and/or may be provided to virtual content renderer 58. Virtual content renderer 58 may render the content to be displayed by display 14. For example, virtual content renderer 58 may receive input from circuitry, such as control circuitry 20, within device 10, based on user input, directions from software running on device 10, environmental sensor input, or other desired input. Virtual content renderer 58 may then render content based on one or more of these inputs and provide the rendered content to display 14 (i.e., to display controller 59). In some embodiments, virtual content renderer 58 may apply the compensation functions/meshes and/or the foveation to the virtual content to produce image frames that are to be displayed by display 14. In some examples, eye tracker 52, gaze and pupil manager 54, mesh and foveation processor 56, and/or virtual content renderer 58 may be part of control circuitry 20 (FIG. 2).

Display 14 may then display image frames that have been produced by virtual content renderer 58 with the computed compensation functions/meshes and/or foveation from mesh and foveation processor 56. In some cases, it may be desirable to update the compensation function/foveation computation regularly, such as when each image frame is displayed, to account for changes in the user's pupil position or point of gaze. However, updating these computations after each image frame may be expensive or impractical. Therefore, it may be desirable to pause the computation of compensation functions and/or foveation in some circumstances. A state diagram showing illustrative modes of operation for display compensation is shown in FIG. 6.

Figure 6:
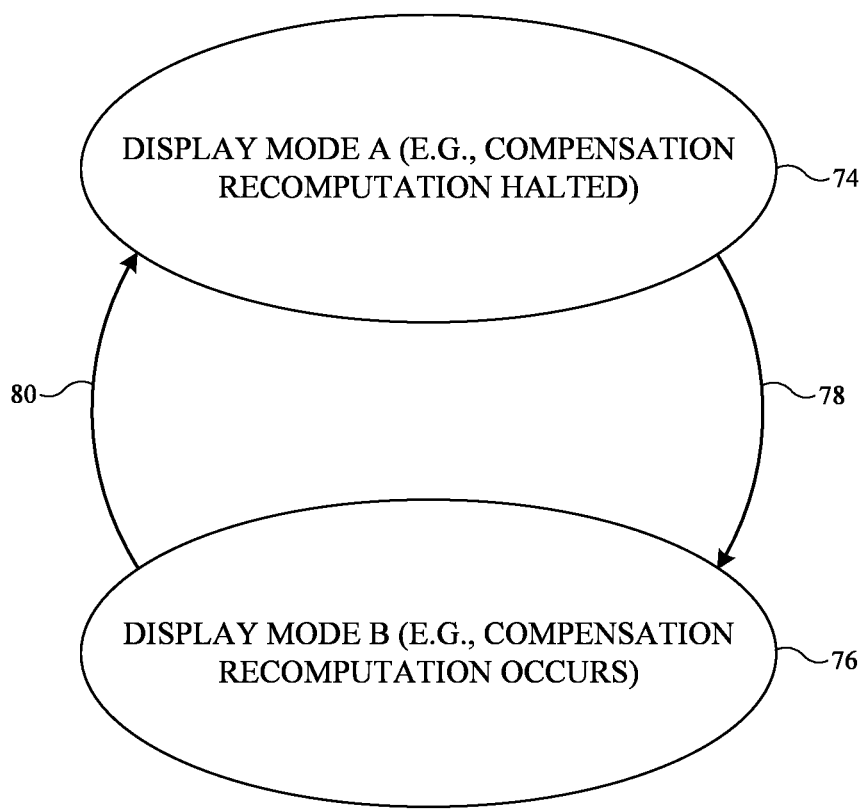
FIG. 6 is a state diagram showing how a display in a head-mounted device is operable in multiple display modes having different display compensation function computations in accordance with some embodiments.

As shown in FIG. 6, device 10 may operate in first mode 74 (display mode A). In display mode A, mesh and foveation processor 56 may halt or pause the computation of compensation functions (i.e., display meshes) and/or foveation. In particular, device 10 may enter display mode A in response to determining that a change in pupil location and/or point of gaze fails to meet a threshold condition (e.g., $\tau$ in Equation 1). For example, the threshold may be 1 mm$^2$, 2 mm$^2$, less than 5 mm$^2$, less than 3 mm$^2$, or other desired threshold value.

If gaze and pupil manager 54 determines that the changes in pupil location fails to meet the threshold condition, then mesh and foveation processor 56 may pause the recomputation of compensation functions/display meshes. While this recomputation is paused, virtual content renderer 58 and/or display controller 59 may prepare image frames that use the previously calculated compensation functions/display meshes. Because the user's pupil location has not changed by the threshold amount, the previous compensation functions may correct any defects in the image frames by a suitable amount.

Similarly, if gaze and pupil manager 54 determines that the changes in the user's point of gaze fail to meet a threshold condition, then mesh and foveation processor 56 may pause the recomputation of foveation. While this recomputation is paused, virtual content renderer 58 and/or display controller 59 may prepare image frames that use the previously calculated foveated rendering. Because the user's point of gaze has not changed by the threshold amount, the previous foveated rendering may produce image frames with a suitable amount of clarity and quality at the user's point of gaze.

As another example, if gaze and pupil manager 54 determines that eye tracking capability (e.g. the capability of eye tracker 54) has been reduced, then mesh and foveation processor 56 may pause the recomputation of compensation functions/display meshes and/or foveation, depending on whether eye tracker 54 has reduced pupil tracking and/or gaze tracking functionality, respectively. While this recomputation is paused, virtual content renderer 58 and/or display controller 59 may prepare image frames that use the previously calculated display meshes and/or foveated rendering. Because the eye tracking capability is reduced, the previously calculated display meshes/foveations may be the best approximations of image compensation.

As a fourth example, if gaze and pupil manager 54 determines that the user is blinking, then mesh and foveation processor 56 may pause the recomputation of compensation functions/display meshes and/or foveation. While this recomputation is paused, virtual content renderer 58 and/or display controller 59 may prepare image frames that use the previously calculated display meshes and/or foveated rendering.

While device 10 operates in Display Mode A, gaze and pupil manager 54 may continue to track the user's pupil location, gaze tracking, blinking status, and/or the device's eye tracking capability. If gaze and pupil manager 54 determines that changes in the user's pupil location or gaze meet the threshold condition, that the user has finished a blink, and/or the device's eye tracking capability is no longer reduced (e.g., depending on the reason for entering Display Mode A), device 10 may follow arrow 78 to second mode 76 (Display Mode B). In Display Mode B, the computation of compensation functions (i.e., display meshes) and/or foveations by mesh and foveation processor 56 may resume. In particular, updated display meshes and/or foveations may be computed based on the new pupil location and/or point of gaze detected by gaze and pupil manager 54.

Device 10 may reenter Display Mode A along arrow 80 when gaze and pupil manager 54 determines that the user's pupil location or gaze does not increase by the threshold amount between two image frames (or over at least 3, at least 4, at least 5, or other desired number of image frames), that the user blinks, and/or that the eye tracking capability is reduced. In this way, device 10 may avoid recalculating compensation functions/display meshes and/or foveations when the user has not moved their eyes or changed their point of gaze (or when the user blinks or the system has reduced eye tracking capability). In other words, device 10 may save power when the user's eye position or gaze has not changed beyond a threshold (i.e., when the previously calculated compensation is sufficient for the next image frame based on the user's eyes/gaze moving by only a small amount). A flowchart of illustrative steps of pausing compensation function calculation based on pupil movement is shown in FIG. 7.

Figure 7:
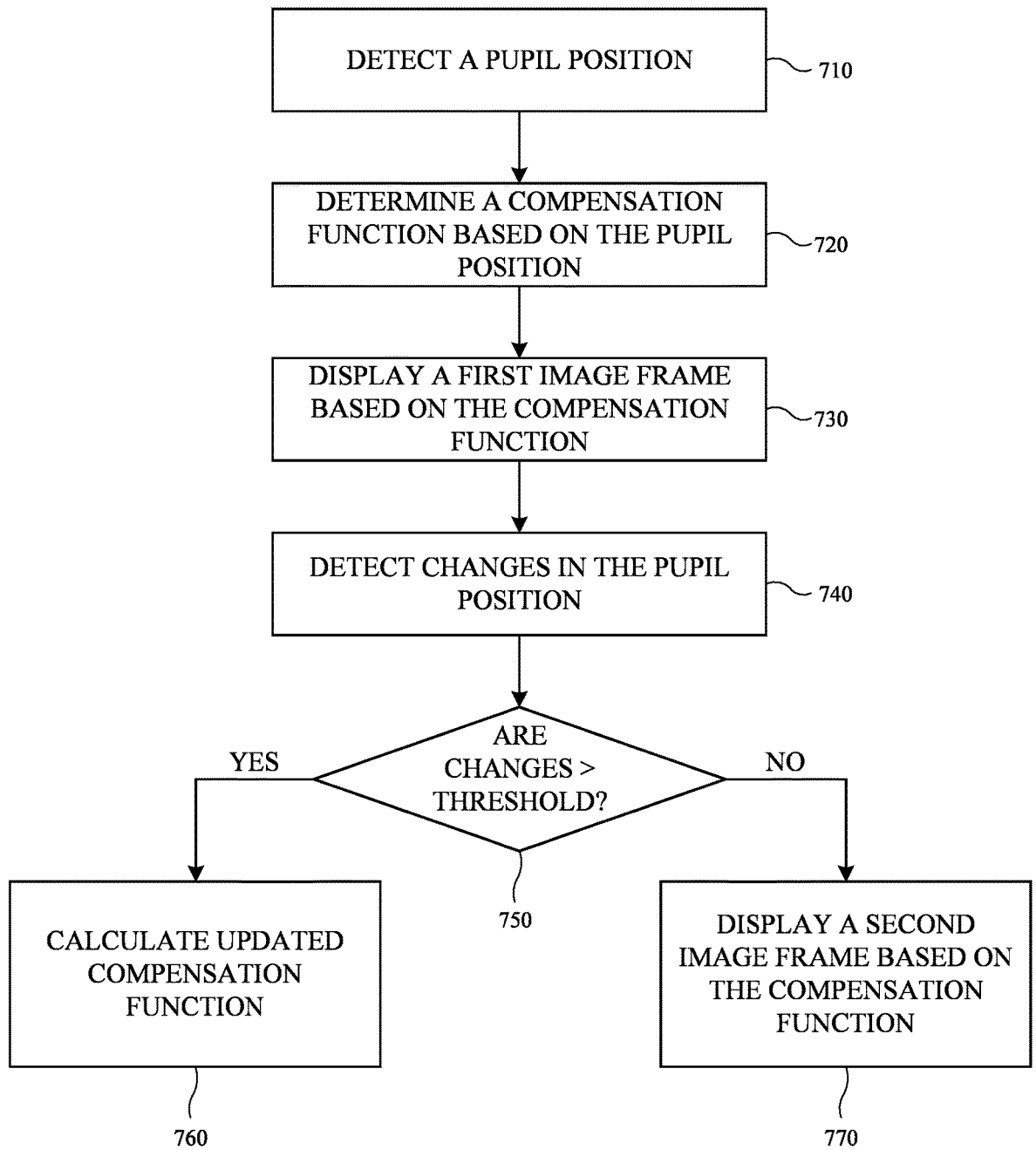
FIG. 7 is a flowchart of illustrative steps for adjusting compensation function computation based on a user's pupil position in accordance with some embodiments.

As shown in FIG. 7, at step 710, an eye tracker may detect a user's pupil position. For example, the eye tracker, such as eye tracker 52 using cameras 50, may track the user's pupil position of one or both eyes. If cameras, such as cameras 50, are used, eye tracker 52 may analyze images of the user's pupil(s) to determine their position. However, any desired components may be used to track the position of a user's pupils.

At step 720, a compensation function processor, such as mesh and foveation processor 56 of FIG. 3, may determine a compensation function based on the detected pupil position. For example, the compensation function processor may determine a display mesh (a mapping of where to display pixels of a virtual image on the physical pixels of a display) to correct for geometric distortion, color aberration, optical cross-talk, and/or vignetting that would otherwise occur in the images due to the position of the user's pupils.

At step 730, a display, such as display 14, may display an image frame based on the compensation function.

At step 740, a pupil position manager, such as gaze and pupil manager 54, may detect changes in the user's pupil position. As discussed in connection with FIG. 4, a user's pupil may be tracked using cameras or other desired sensors at desired intervals (such as at each displayed image frame, at least three image frames, at least four image frames, or other desired interval). In some examples, the pupil position manager may calculate a variance between two or more pupil positions. The pupil position manager may compare the positions of the user's pupil across any number of these intervals.

At step 750, the pupil position manager may determine whether the changes in the user's pupil position are greater than a threshold condition. The threshold condition may be, for example, that the pupil position has changed by 1 mm, 2 mm, less than 5 mm, less than 3 mm, or other desired threshold value.

If the changes in pupil position are greater than the threshold (i.e., the changes in pupil position meet the threshold condition), at step 760, a compensation function processor, such as mesh and foveation processor 56 may calculate an updated compensation function based on the user's new pupil position. For example, the compensation function processor may determine an updated display mesh to correct for geometric distortion, color aberration, optical cross-talk, and/or vignetting that would otherwise occur in the images due to the position of the user's pupils.

If the changes in pupil position are less than threshold (i.e., the changes in the detected pupil position fail the threshold condition), at step 770, the display may display a second image frame based on the compensation function that was used to display the first image frame, or may display the second image frame without recalculating the compensation function. In particular, because the user's pupil position has not changed by the threshold amount, the current compensation function may be sufficient to correct the images.

The operations of FIG. 7 may be performed periodically, in response to a user input (e.g., in response to the user opening a window, starting an application, playing a video, stopping a video, making a hand gesture, moving his/her head, adjusting system power settings, etc.) or can be continuously performed as a background process when device 10 is powered on. Although FIG. 7 shows changing whether compensation functions are updated based on a user's pupil position, device 10 may similarly change whether foveation is updated based on a user's point of gaze.

Figure 8:
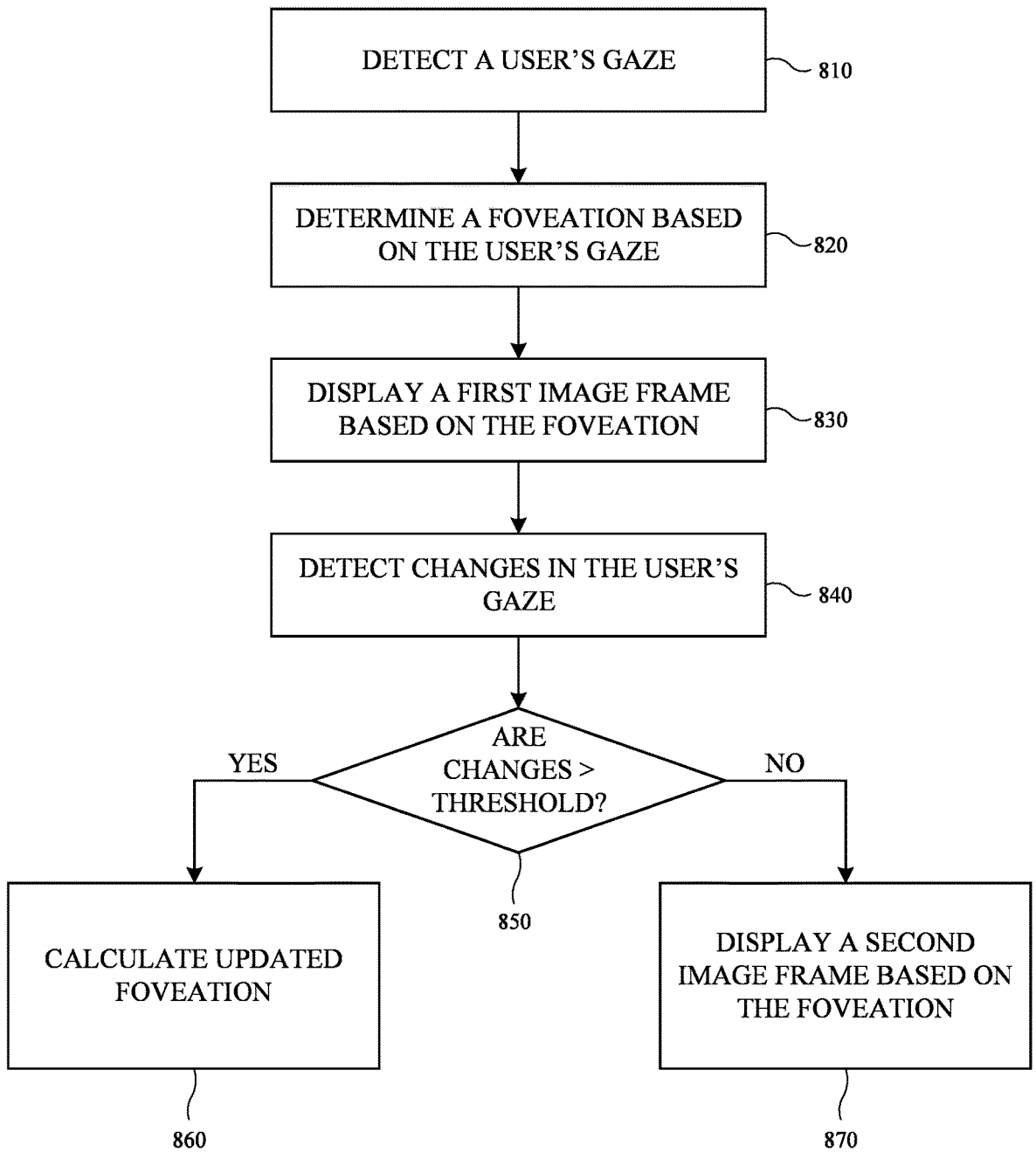
FIG. 8 is a flowchart of illustrative steps for adjusting foveation computation based on a user's gaze in accordance with some embodiments.

A flowchart of illustrative steps that may be used to adjust the calculation of foveation is shown in FIG. 8.

As shown in FIG. 8, at step 810, a gaze tracker may determine a user's point of gaze. For example, the gaze tracker, such as eye tracker 52 using cameras 50, may track the user's gaze. If cameras, such as cameras 50, are used, eye tracker 52 may analyze images of the user's gaze to determine its position. However, any desired components may be used to track the position of a user's gaze.

At step 820, a foveation processor, such as mesh and foveation processor 56 of FIG. 3, may determine a foveation based on the user's point of gaze. For example, the foveation processor may determine a foveation with which image frames may be displayed to ensure that information/images at the user's point of gaze is clearer, of higher quality, or of higher resolution than the information/images at the periphery of the user's vision. This may allow for reduced power consumption without noticeably reducing display quality for a user, for example.

At step 830, a display, such as display 14, may display an image frame based on the foveation At step 840, a gaze manager, such as gaze and pupil manager 54, may detect changes in the user's gaze. As discussed in connection with FIG. 5, a user's gaze may be tracked using cameras or other desired sensors at desired intervals (such as at each displayed image frame, at least three image frames, at least four image frames, or other desired interval). In some examples, the gaze manager may calculate a variance between two or more points of gaze. The gaze manager may compare the positions of the user's point of gaze any number of these intervals.

At step 850, the gaze manager may determine whether the changes in the user's point of gaze are greater than a threshold condition. The threshold condition may be, for example, that the pupil position has changed by 1 mm, 2 mm, less than 5 mm, less than 3 mm, or other desired threshold value.

If the changes in point of gaze are greater than the threshold (i.e., the changes in the user's gaze meet the threshold condition), at step 860, a foveation processor, such as mesh and foveation processor 56, may calculate an updated foveation based on the user's new point of gaze.

If the changes in point of gaze are less than threshold (i.e., the changes in the user's gaze fail the threshold condition), at step 870, the display may display a second image frame based on the foveation that was used to display the first image frame, or may display the second image frame without recalculating the foveation. In particular, because the user's pupil position has not changed by the threshold amount, the current foveation may be sufficient to correct the images.

The operations of FIG. 8 may be performed periodically, in response to a user input (e.g., in response to the user opening a window, starting an application, playing a video, stopping a video, making a hand gesture, moving his/her head, adjusting system power settings, etc.) or can be continuously performed as a background process when device 10 is powered on.

Figure 9:
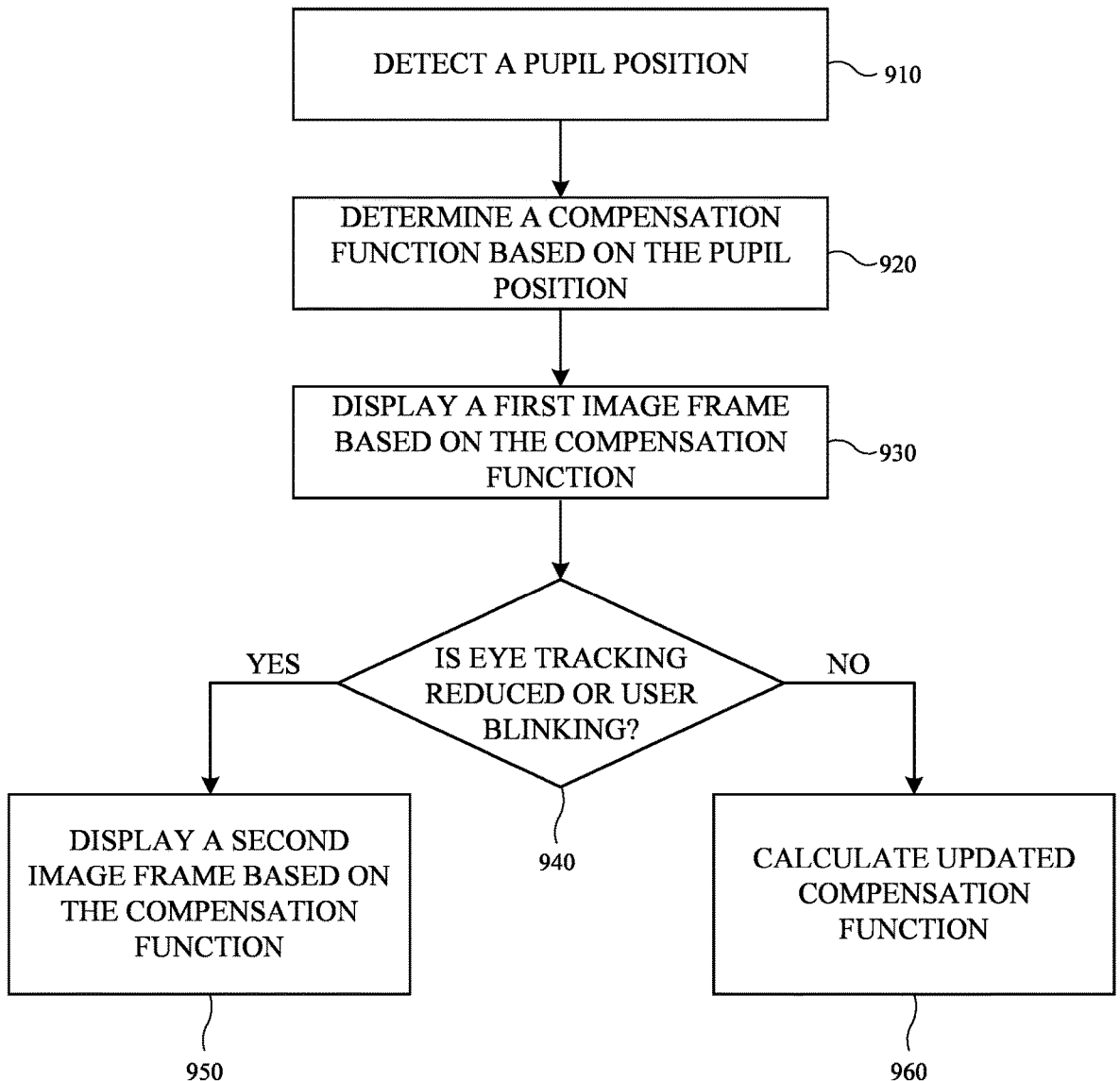
FIG. 9 is a flowchart of illustrative steps for adjusting compensation function computation based on the availability of eye tracking capability and/or whether a user is blinking in accordance with some embodiments.

As an alternative to, or in addition to, the compensation function and foveation computation adjustments of FIGS. 7 and 8, device 10 may pause computation of compensation functions based on a loss or reduction of eye tracking and/or a detected blink. A flowchart of illustrative steps of pausing compensation function calculation based on loss of eye tracking/blinking is shown in FIG. 9.

At step 910, an eye tracker may detect a user's pupil position. For example, the eye tracker, such as eye tracker 52 using cameras 50, may track the user's pupil position of one or both eyes. If cameras, such as cameras 50, are used, eye tracker 52 may analyze images of the user's pupil(s) to determine their position. However, any desired components may be used to track the position of a user's pupils.

At step 920, a compensation function processor, such as mesh and foveation processor 56 of FIG. 3, may determine a compensation function based on the detected pupil position. For example, the compensation function processor may determine a display mesh (a mapping of where to display pixels of a virtual image on the physical pixels of a display) to correct for geometric distortion, color aberration, optical cross-talk, and/or vignetting that would otherwise occur in the images due to the position of the user's pupils.

At step 930, a display, such as display 14, may display an image frame based on the compensation function.

At step 940, a processor, such as eye tracker 52, gaze and pupil manager 54, mesh and foveation processor 56, or other processor in device 10, may determine that eye tracking capability is reduced and/or that the user is blinking. For example, cameras in device 10 may determine that a user is blinking. As a result, eye tracker 52 may be unable to determine an updated pupil position. Alternatively or additionally, eye tracker 52 itself may have reduced eye tracking capability, which may be detected by circuitry within device 10.

If it is determined that there is reduced eye tracking capability and/or the user is blinking, at step 950, the display may display a second image frame based on the compensation function that was used to display the first image frame, or may display the second image frame without recalculating the compensation function. In other words, the calculation of compensation functions may be halted or paused.

If it is determined that there is full eye tracking capability and/or the user is not blinking, at step 960, a compensation function processor, such as mesh and foveation processor 56 may calculate an updated compensation function based on the user's new pupil position. For example, the compensation function processor may determine an updated display mesh to correct for geometric distortion, color aberration, optical cross-talk, and/or vignetting that would otherwise occur in the images due to the position of the user's pupils. In some embodiments, this determination may be coupled to a determination from the process described in FIG. 7 regarding the change in pupil location. If the pupil location has changed more than a threshold amount, an updated compensation function may be calculated at step 960. Otherwise, the recalculation may be paused until there is pupil movement that meets the threshold.

The operations of FIG. 9 may be performed periodically, in response to a user input (e.g., in response to the user opening a window, starting an application, playing a video, stopping a video, making a hand gesture, moving his/her head, adjusting system power settings, etc.) or can be continuously performed as a background process when device 10 is powered on.

Although FIG. 9 describes pausing compensation function calculation in response to loss of eye tracking or blinking, this is merely illustrative. Foveation calculation may be paused in addition to or instead of compensation function calculation in response to the loss of eye tracking or the detection of a user blink.

The processes of FIGS. 7-9 may be operated separately, or together in any combination.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, pLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A method of operating a device having a display, comprising:
   detecting a pupil position of a user;
   based on the detected pupil position, determining a compensation function for displaying image frames on the display;
   displaying a first image frame based on the compensation function;
   in response to determining that changes in the detected pupil position meet a threshold condition, calculating an updated compensation function; and
   in response to determining that the changes in the detected pupil position fail the threshold condition, displaying a second image frame on the display based on the compensation function.

2. The method of claim 1, further comprising:
   determining the changes in the detected pupil position by detecting a first pupil position and a second pupil position and calculating a variance between the first pupil position and the second pupil position.

3. The method of claim 1, wherein determining the compensation function comprises determining a function that compensates for one or more of geometric distortion, color aberration, optical cross-talk, and vignetting.

4. The method of claim 1, wherein detecting the pupil position comprises capturing images of a pupil and analyzing the images to determine the pupil position.

5. The method of claim 1, further comprising:
   detecting a gaze of the user;
   based on the gaze of the user, determining a foveation for displaying the image frames on the display; and
   in response to determining that changes in the detected gaze of the user meet an additional threshold condition, calculating an updated foveation.

6. The method of claim 5, further comprising:
   displaying the first image frame on the display based on the foveation; and
   in response to determining that the changes in the detected gaze of the user fail the additional threshold condition, displaying the second image frame on the display based on the foveation.

7. The method of claim 1, further comprising:
   detecting a blink; and
   pausing recalculation of the compensation function during the blink.

8. The method of claim 1, further comprising:
   detecting a loss of eye tracking capability; and
   pausing recalculation of the compensation function during the loss of eye tracking capability.

9. A method of operating a device having a display, comprising:
   detecting a pupil position of a user;
   based on the detected pupil position, determining a compensation function for displaying image frames on the display;
   displaying a first image frame on the display based on the compensation function; and
   in response to detecting a reduced eye tracking capability, displaying a second image frame on the display based on the compensation function.

10. The method of claim 9, further comprising:
    in response to detecting a return of eye tracking capability, calculating an updated compensation function.

11. The method of claim 9, further comprising:
    in response to determining that changes in the detected pupil position meet a threshold condition, calculating an updated compensation function.

12. The method of claim 11, further comprising:
in response to determining that the changes in the detected pupil position fail the threshold condition, displaying an additional image frame on the display based on the compensation function.

13. The method of claim 9, further comprising:
detecting a blink; and
pausing recalculation of the compensation function during the blink.

14. The method of claim 13, further comprising:
resuming the recalculation of the compensation function after the blink.

15. An electronic device, comprising:
one or more displays configured to display image frames;
a pupil tracker; and
one or more processors configured to:
　detect a pupil position;
　based on the detected pupil position, determine a compensation function for displaying image frames on the display;
　display a first image frame on the display based on the compensation function; and
　in response to determining that changes in the detected pupil position fail a threshold condition, display a second image frame on the display based on the compensation function.

16. The electronic device of claim 15, wherein the one or more processors is further configured to determine an updated compensation function in response to determining that the changes in the detected pupil position meet the threshold condition.

17. The electronic device of claim 16, wherein the pupil tracker comprises one or more cameras that takes images of a pupil, and wherein the one or more processors is configured to detect the pupil position by processing the images of the pupil.

18. The electronic device of claim 16, wherein the one or more processors is further configured to:
　detect a loss of pupil tracking; and
　in response to detecting the loss of pupil tracking, pause recalculation of the compensation function during the loss of pupil tracking.

* * * * *